(12) United States Patent
Ruskin et al.

(10) Patent No.: US 6,644,495 B2
(45) Date of Patent: Nov. 11, 2003

(54) PROCESSING METHOD FOR VENDING MACHINE WITH SUBSTITUTABLE MAGAZINES

(75) Inventors: Frank Ruskin, Los Angeles, CA (US); Anton K. Simson, Poway, CA (US); Henri J. A. Charmasson, San Diego, CA (US); Peter C. Brusso, Anaheim Hills, CA (US)

(73) Assignee: Distributed Vending Company, Los Angeles, CA (US)

( * ) Notice: Subject to any disclaimer, the term of this patent is extended or adjusted under 35 U.S.C. 154(b) by 66 days.

(21) Appl. No.: 10/119,227

(22) Filed: Apr. 8, 2002

(65) Prior Publication Data

US 2002/0153382 A1 Oct. 24, 2002

Related U.S. Application Data

(63) Continuation-in-part of application No. 09/666,038, filed on Sep. 20, 2000, now Pat. No. 6,367,653, which is a continuation-in-part of application No. 09/414,910, filed on Oct. 8, 1999, now Pat. No. 6,330,958, and a continuation-in-part of application No. PCT/US98/08064, filed on Apr. 15, 1998, and a continuation-in-part of application No. 08/844,767, filed on Apr. 22, 1997, now abandoned.

(51) Int. Cl.[7] .............................................. B65G 59/00
(52) U.S. Cl. ........................................... 221/1; 700/241
(58) Field of Search ............................... 221/1, 7, 9, 13, 221/14, 17; 700/231, 241, 236; 340/10.1

(56) References Cited

U.S. PATENT DOCUMENTS 4,306,219 A   12/1981   Main et al.
4,412,292 A   10/1983   Sedam et al.

FOREIGN PATENT DOCUMENTS

WO   WO 00/31701   6/2000

*Primary Examiner*—Kenneth W. Noland
(74) *Attorney, Agent, or Firm*—Henri J. A. Charmasson; John D. Buchaca

(57) ABSTRACT

A method for centralized mass processing of substitutable, good-holding magazines used in conjunction with computer-controlled vending machines. A memory-chip-mounting smart-card is used, not only to enter into the machines the magazine location and price of the various goods, but also to carry a sales transaction record of the replaced magazine, thus avoiding the need for magazine locking mechanisms and other security measures.

33 Claims, 1 Drawing Sheet

PROCESSING METHOD FOR VENDING MACHINE WITH SUBSTITUTABLE MAGAZINES

PRIOR APPLICATION

This is a continuation-in-part of application Ser. No. 09/666,038 filed Sep. 20, 2000, now U.S. Pat. No. 6,367,653, which is a continuation-in-part of application Ser. No. 09/414,910 filed Oct. 8, 1999, now U.S. Pat. No. 6,330,958, a continuation-in-part of application Ser. No. PCT/US98/08064 filed Apr. 15, 1998, a continuation-in-part application of Ser. No. 08/844,767 filed Apr. 22, 1997 and now abandoned.

FIELD OF THE INVENTION

This invention relates to vending machines, and more specifically to the type of vending machines with substitutable good-holding magazines.

BACKGROUND OF THE INVENTION

Disclosed in this application's parent U.S. Pat. No. 6,367,653 Ruskin et al., which patent is specifically incorporated into this specification by this reference, is a type of vending machine using substitutable magazines. The magazines can be filled at a central location then distributed at a number of sites to be substituted for fully or partly expended magazines previously installed in vending machines. The referenced patent teaches a variety of mechanisms for securing the vending machines and guaranteeing the integrity of the magazine contents during transportation and installation, including the integrity of the currency taken as payments for dispensed goods and accumulated in the magazines. The referenced patent also teaches various methods and devices for keeping and processing records of sale transactions.

It is well-known in the vending industry that locks and other mechanical security measures are costly, sometimes awkward to operate and not always tamper-proof. A lost key or malfunctioning lock can cause substantial loss of time and necessitate the intervention of a locksmith. A stolen key can be used by unscrupulous person to get access to the vending machine.

SUMMARY OF THE INVENTION

The principal and secondary objects of this invention are to provide a keyless process for guaranteeing the security of substitutable good-holding magazines used in connection with certain types of vending machines and of their contents; to provide an accurate and reliable record of all sale transactions; to allow quick and easy reprogramming of menus and prices for the goods available from a machine; and to automate the inventorying of goods and magazines.

These and other valuable objects are achieved by using a machine-readable recording medium, preferably a memory chip-mounting smart-card to program the location and prices of goods in a vending machine, to record the sale transactions, including the amount of currency collected in connection with a previously installed magazine that is being replaced, and to provide a fool-proof reconciliation between the contents of a returned magazine and those sale transactions.

Typically, a service person can visit up to sixty sites where one or more vending machines are being used. A medium-sized service truck can carry up to sixty snack food magazines and a corresponding number of beverage-holding canisters. It has been found that a single smart-card can store enough data to control all the machines on a route, i.e., machines that can be serviced by a truck team in a single day. While such a smart-card is the preferred machine-readable medium in the practice of the invention, other media such as palm-held and Internet connected devices can also be advantageously used. It is also possible to use one small-capacity smart-card in association with each magazine. In that case, the card can be physically carried in a slot pocket or other receptacle mounted on the magazine.

DESCRIPTION OF THE PREFERRED EMBODIMENT OF THE INVENTION

Figure 1:
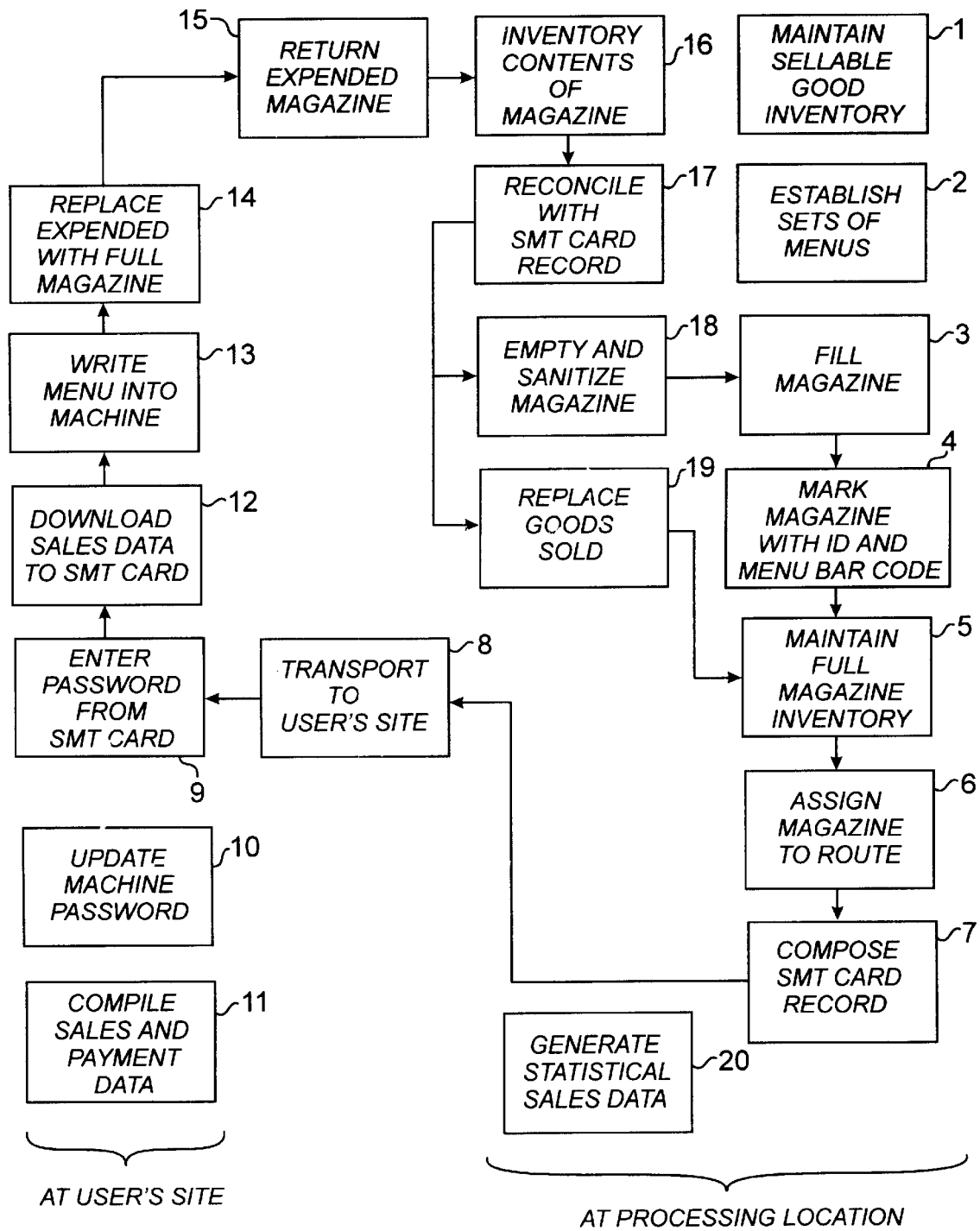
FIG. 1 is a block diagram of the machine and magazine processing method according to the invention.

Referring now to the drawing, there is illustrated in FIG. 1, a method for processing and controlling a vending machine operation based on the use of substitutable good-holding magazines that are refilled at a central processing location, then distributed along assigned routes for installation in vending machines at various users' sites in replacement for totally or partially expended magazines previously installed at those sites. Several embodiments of this type of vending machine are disclosed in the patent incorporated in this specification.

The method assumes and includes maintaining an inventory of salable goods that can be distributed by the vending machines. These goods typically include snack food items and beverages.

Machine menus are established 2 that specify what goods are to be loaded in each slot or pigeon hole in a magazine, and at what price each of those goods will be sold.

A stock of magazines is kept from which some of them are extracted and filled 3 according to some of the established menus. Each magazine is marked with a machine-readable identification code as well as menu code, preferably in bar code form, as well as in visually perceptible form. An inventory of such full magazines is maintained 5. A distribution route is established and a number of said full magazines are assigned 6 and appropriately earmarked for distribution along that route. The magazines, their menus, route assignment and the specific machines into which the magazines are to be installed are combined into a file that is recorded 7 on a memory chip-mounting smart-card for use by the service person assigned to service the route. The set of filled magazines is then transported 8 for installation into vending machines at the various user's sites.

Upon arrival at a user's site, the service person introduces a smart-card into the machine card-reading slot in order to enter into the machine 9 a password that will allow opening the machine and getting access to its substitutable, previously installed magazine. In order to safeguard the security of the machine against misuse of a stolen card, each vending machine is programmed to update its password 10 on a periodical basis, e.g., every evening. The finder of a lost card or an unscrupulous service person could not return to the site and use an outdated card to get access to the machine and to the currency receptacle of its substitutable magazine.

The machines are programmed to compile sales and payment data 11 including the amount of currency that has been received as payment for the distributed goods. According to the teachings of the incorporated patents, the vending machine can accept payment via a debit smart-card. It is therefore, critical, that the compilation of the payments provide a clear distinction between payments made by debit smart-card, currency, credit card or by other electronic medium. Debit smart-cards can be conveniently reloaded by depositing currency into the machine. The deposit is instantly credited by a corresponding amount of debitable fund. Accordingly, some of the currency accumulated in a substitutable magazine may not be attributed to the sale of goods, but to the reloading of a debit smart-card.

After entering the password which allows opening of the vending machine, the sale data accumulated by the vending machine is downloaded 12 onto the service person's smart-card. The downloading of the data associated with the previously installed magazine, that is being replaced and is to be returned to the processing location terminates the first half of the data processing associated with the magazine substitution. The machine, then, extracts 13 from the smart-card, the menu corresponding to the magazine that is about to be installed. The machine is now programmed to vend each item in the newly installed magazine upon a payment specified on the down-loaded menu. The menu preferably includes specifications and instructions for selling a combination of two items at a discount price. This feature may be used for promotional purpose, or to enhance sales during periods of low sale activity. The fully or partially expended and previously installed magazine is now replaced 14 with the full magazine. The former is returned 15 to the processing location.

Upon arrival at the the processing location, the contents of the returned magazine is inventoried 16 and reconciled 17 with the sale data recorded on the service person's smart-card. Depending upon the expiration dates of the goods remaining in the magazine, the contents can be removed 18 and the magazine sanitized, or the goods that have been sold can be replaced 19 before the magazine is returned to the full magazine inventory. A magazine that has been emptied and sanitized is available for refilling 3. The sale data accumulated in the service person's smart-card can also be used, not only to update the salable good inventory, but also to generate 20 statistical sales data which may be useful in planning future magazine loading 3, restocking the salable goods inventory 1 and focusing promotional general marketing activities. For this purpose, the sale data is preferably indexed at the time of each sale with some time-related and location-related references.

A simple product control data processing program is advantageously used to integrate the filling of the magazine and the good-selling transaction accounts with the sellable good inventory.

While the preferred embodiment of the invention has been described, modifications can be made and other embodiments may be devised without departing from the spirit of the invention and the scope of the appended claims.

What is claimed is:

1. A method for processing vending machine removable, good-holding magazines in connection with a plurality of vending sites, each site having at least one of said vending machines, said method comprising the steps of:
   assigning to each magazine an identification code;
   marking said magazine with said code;
   establishing a plurality of price-and-location menus for said magazines, each of said menus listing the locations in a magazine of a series of goods and the sale price of each of said goods;
   filling said magazines in accordance with said menus;
   keeping a record of each of said magazines by identification numbers and related menus;
   assigning a set of said magazines to a route including a number of said sites;
   recording on a machine-readable medium, a route distribution database including magazine identification codes, menus and site identification codes;
   transporting said magazines to their respective sites;
   at each of said sites and in at least one of said vending machines,
   compiling an account of selling transactions out of a magazine previously installed in said vending machine;
   replacing said previously installed magazine with one of said transported magazines;
   downloading from said vending machine and onto said machine-readable medium, said compiled account;
   reading from said machine-readable medium and writing into said machine, a menu corresponding to said identification code;
   returning said previously installed magazine to a processing center;
   at said processing center,
   inventorying the contents of said previously installed magazine; and
   reconciling said contents with said downloaded, compiled account.

2. The method of claim 1, wherein the step of marking said magazine comprises applying said identification code to said magazine in a machine-readable form.

3. The method of claim 2, wherein said machine-readable form comprises a bar-coded indicium.

4. The method of claim 2, wherein said step of inventorying comprises machine-reading said indicium.

5. The method of claim 1, wherein said step of recording a database comprises recording a vending machine opening pass-word.

6. The method of claim 5, which further comprises, at each site, opening said vending machine by reading from said machine-readable medium said pass-word.

7. The method of claim 6, which further comprises programming each of said vending machines to periodically require a modified pass-word.

8. The method of claim 1, wherein said step of establishing menus comprises listing a combination of at least two locations under a single price;
   whereby two goods may be dispensed by a vending machine at a discount price.

9. The method of claim 1 which further comprises, at said processing center, replacing sold goods in said previously installed magazines and adding said magazine to said record.

10. The method of claim 1 which further comprises:
    maintaining an inventory of said goods available for filling said magazines; and
    integrating said filling and inventorying with said inventory.

11. The method of claim 10 which further comprises:
    maintaining an inventory of said goods available for filling said magazines; and
    integrating said filling, inventorying and replacing with said inventory.

12. The method of claim 1, wherein said steps of recording on, downloading onto and reading from, said machine-readable medium comprises recording on, downloading onto and reading from a smart-card.

13. The method of claim 12, wherein said steps of recording on, downloading onto and reading from said machine-readable medium comprises recording on, downloading onto and reading from a single smart-card for all machines on said route.

14. The method of claim 1 which further comprises marking each of said magazines with an indicium of an assigned menu.

15. The method of claim 1 which further comprises marking each of said magazines with an indicum of destination vending machine.

16. The method of claim 1, wherein said step of compiling comprises accumulating a record of payments received by said vending machine.

17. The method of claim 16, wherein said step of accumulating comprises calculating the amount of currency collected by said vending machine into said magazine.

18. The method of claim 17, wherein said step of inventorying comprises counting currency accumulated in said magazine.

19. The method of claim 1, wherein said step of compiling comprises indexing said selling transactions with time information.

20. The method of claim 1 which further comprises generating from said downloaded compiled account, statistical sales data.

21. A method for processing vending machine removable, good-holding magazines in connection with a plurality of vending sites, each site having at least one of said vending machines, said method comprising the steps of:

assigning to each magazine an identification code;

establishing a plurality of price-and-location menus for said magazines, each of said menus listing the location in a magazine of a series of goods and the sale price of each of said goods;

filling said magazines in accordance with said menus;

keeping a record of each of said filled magazines;

assigning a set of said magazines to a route including a number of said sites;

recording on a machine-readable medium, a route distribution database including magazine identification codes, and menus;

transporting said magazines to their respective sites;

at each of said sites and in at least one of said vending machines, compiling an account of good-selling transactions out of a magazine previously installed in said vending machine;

replacing said previously installed magazine with one of said transported magazines;

downloading from from said vending machine and onto said machine-readable medium, said compiled account;

reading from said machine-readable medium and writing into said machine, a menu corresponding to said identification code;

returning said previously installed magazine to a processing center;

at said processing center, inventorying the contents of said previously installed magazine; and reconciling said contents with said downloaded, compiled account.

22. A method for managing vending machines in connection with a plurality of vending sites, each site having at least one vending machine, said method comprising the steps of:

assigning to each of said vending machines an identification code;

establishing a plurality of price-and-location menus for said machines, each of said menus listing the locations in a machine holding series of goods and the sale price of each of said goods;

filling said machines in accordance with said menus;

keeping a record of each of said machines by identification numbers and related menus;

recording on a machine-readable medium, a route database including machine identification codes, menus and site identification codes;

at each of said sites and in at least one of said vending machines, compiling an account of good-selling transactions for a set of goods previously installed in said vending machine;

downloading from from said vending machine and onto said machine-readable medium, said compiled account;

reading from said machine-readable medium and writing into said machine, a menu corresponding to said identification code.

23. The method of claim 22, wherein said step of recording comprises writing said database on a chip-carrying smart-card.

24. The method of claim 22, wherein said step of recording a database comprises recording a vending machine opening pass-word.

25. The method of claim 23 which further comprises, at each site, opening said vending machine by reading said pass-word from said machine-readable medium.

26. The method of claim 25 which further comprises programming each of said vending machines to periodically require a modified pass-word.

27. The method of claim 22, wherein said step of establishing menus comprises listing a combination of at least two of said locations under a single price;

whereby two goods may be dispensed by a vending machine at a discount price.

28. The method of claim 22, wherein said steps of recording on, downloading onto and reading from, said machine-readable medium comprises recording on, downloading onto and reading from a smart-card.

29. The method of claim 28, wherein said steps of recording on, downloading onto and reading from said machine-readable medium comprises recording on, downloading onto and reading from a single smart-card for all machines on said route.

30. The method of claim 22, wherein said step of compiling comprises accumulating a record of payments received by said vending machine.

31. The method of claim 30 wherein said step of accumulating comprises calculating the amount of currency collected by said vending machine.

32. The method of claim 22, wherein said step of compiling comprises indexing said good selling transactions with time information.

33. The method of claim 22 which further comprises generating from said downloaded compiled account, statistical sales data.

* * * * *